A. & M. SIMMONS.
Cultivator-Fender.

No. 213,948.                Patented April 1, 1879.

WITNESSES:
Achilles Schehl
C. Sedgwick

INVENTOR:
A. Simmons
M. Simmons
BY
ATTORNEYS.

UNITED STATES PATENT OFFICE.

ANDREW SIMMONS, OF GREEN VALE, AND MICHAEL SIMMONS, OF LENA, ILL.

IMPROVEMENT IN CULTIVATOR-FENDERS.

Specification forming part of Letters Patent No. 213,948, dated April 1, 1879; application filed January 17, 1879.

*To all whom it may concern:*

Figure 1:
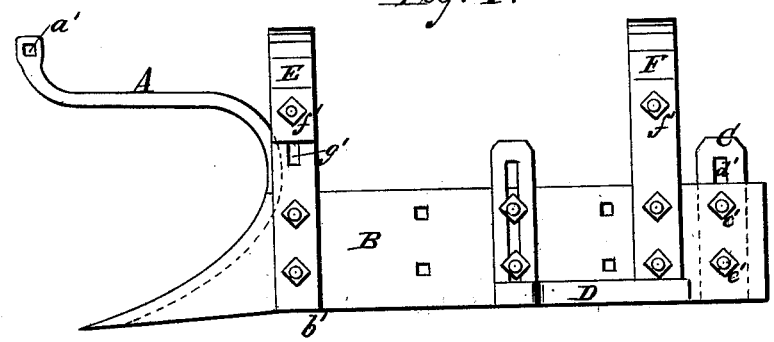
Figure 2:
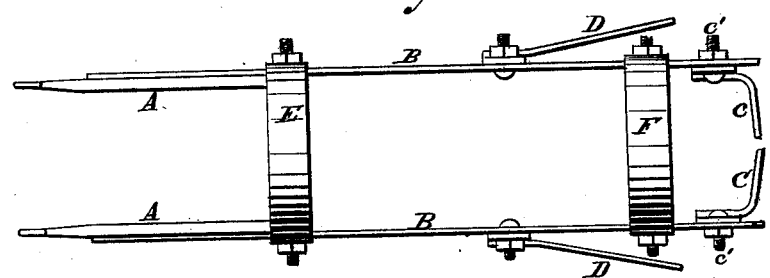
Figures 3, 4:
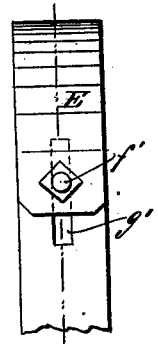
Figure 5:
Figure 5:
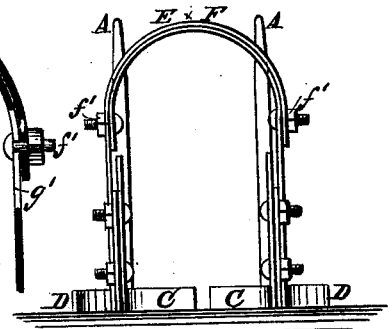

Be it known that we, ANDREW SIMMONS, of Green Vale, in the county of Jo Daviess and State of Illinois, and MICHAEL SIMMONS, of Lena, in the county of Stephenson and State of Illinois, have invented a new and Improved Cultivator-Fender, of which the following is a specification:

Figure 1 is a side elevation of the fender. Fig. 2 is a plan of same. Fig. 3 is an end view of same. Fig. 4 is a vertical section through $x$ $x$. Fig. 5 is a side view of the connecting-bows.

Similar letters of reference indicate corresponding parts.

This invention has for its object the construction of a cultivator-fender, composed of two like parts or halves and their attachments, which, when united, form a most desirable cultivator attachment, and when used singly—attached to a single-horse cultivator, for instance—perfectly fulfills the objects for which it is designed.

In the drawings, A A are two curved pointed rods, which are to be attached to a cultivator by their eyes $a'$ $a'$, and which serve, when in operation, to lift up the leaves of plants as they pass under them. Attached to these rods are the shields or fenders B B, which prevent the earth from being thrown upon the plants by the operating cultivator-plows.

It must be understood that when this machine is attached to a two-wheeled cultivator it is arranged between its shovels or plows and straddles the row of plants, and that when but half of it is used, that half is so attached to the single-wheeled cultivator that its position is between the plants and the plows.

It will be noticed that the fenders are cut away a little at point $b'$. This is done in order that the plows may push under them the small amount of earth that is ordinarily required about the plants at the season when the cultivator is used.

To the inside faces of the fenders are attached flanges or wings C C, as shown. They are held in position by bolts $c'$ $c'$, engaging in slots $d'$ $d'$ in their upright arms, and can, by this arrangement, be adjusted in a higher or lower position, as desired. The use of these wings is to carry to the plants the earth, or as much of it as is necessary, when the plows force under the lower edges of the fenders.

D D are other flanges or wings on the outside of the fenders. It will be seen that these are adjustable in the same way as are the wings C C. The purpose of these is to push back into the furrow made by the plow all surplus earth, to level it off on the plane desired by the operator of the cultivator. The use of any of these wings may at any time be dispensed with without in any way affecting my invention.

The two bows E and F, each in two parts, and attached to the fenders or shields, as shown, are for the purpose of holding the two parts of the apparatus together, and at the same time to adjust them at any desired distance apart. The adjusting is done by means of the bolts $f'$ $f'$ passing through one section of a bow and engaging in slots $g'$ $g'$ in the other section, as shown. These bows may be entirely removed when it is desired to use but one-half of the machine.

We do not broadly claim a cultivator shield or fender, for we are aware that they have been in use for some years; and we are aware that adjustable points or lifters attached to the shield have also been used; but,

Having thus described our invention, we claim as new and desire to secure by Letters Patent—

A cultivator-fender consisting of two curved pointed rods, A A, having eyes $a'$, and the shields B, cut away at $b'$, having adjustable wings C D, and connected by the bows E, as shown and described.

ANDREW SIMMONS.
MICHAEL SIMMONS.

Witnesses:
ANDREW CONWAY,
E. O. HILL.